United States Patent [19]

English et al.

[11] Patent Number: 4,967,337
[45] Date of Patent: Oct. 30, 1990

[54] AUTOMATED DIAGNOSTIC SYSTEM

[75] Inventors: Roe E. English, Euless; Michael A. Kilgore, McKinney; Jerry A. Crone, Kaufman, all of Tex.

[73] Assignee: Texas Instruments Incorporated, Dallas, Tex.

[21] Appl. No.: 256,020

[22] Filed: Oct. 11, 1988

[51] Int. Cl.$^5$ .................. G06F 11/30; G06F 15/46
[52] U.S. Cl. .................................. 364/184; 364/185; 364/550; 371/16.5; 371/17; 371/29.1
[58] Field of Search ................ 364/184, 5, 188, 130, 364/550, 474.16, 570, 513; 371/15, 16.5, 20, 25, 29.1, 14, 17; 324/512

[56] References Cited

U.S. PATENT DOCUMENTS

| | | | |
|---|---|---|---|
| 4,521,847 | 6/1985 | Ziehm et al. | 364/184 |
| 4,628,435 | 12/1986 | Tashiro et al. | 364/130 |
| 4,642,782 | 2/1987 | Kemper et al. | 364/550 |
| 4,644,479 | 2/1987 | Kemper et al. | 364/550 |
| 4,654,106 | 3/1987 | Davis et al. | 156/345 |
| 4,685,999 | 8/1987 | Davis et al. | 156/643 |
| 4,687,542 | 8/1987 | Davis et al. | 156/643 |
| 4,697,243 | 9/1987 | Moore et al. | 364/184 |
| 4,710,763 | 12/1987 | Franke et al. | 340/723 |
| 4,841,456 | 6/1989 | Hogan, Jr. et al. | 364/550 |

Primary Examiner—Jerry Smith
Assistant Examiner—Paul Gordon
Attorney, Agent, or Firm—Gary C. Honeycutt; Melvin Sharp; N. Rhys Merrett

[57] ABSTRACT

Artificial intelligence diagnostic expert system software is used to interrogate and monitor etcher machine state by directly accessing vital hardware/process sensors. Sensor values and 'recipe' variables are analyzed to determine cause of failures and recommend repair strategies, realtime monitoring and analysis of these values allows the expert system to predict failures prior to occurrence and show cause of impending failure.

10 Claims, 3 Drawing Sheets

AUTOMATED DIAGNOSTIC SYSTEM

BACKGROUND OF THE INVENTION

The present invention relates to automated machinery, and more specifically to an intelligent, automated diagnostic system for determining the cause of an error or fault in factory machines.

Complex factories are continuing to become more highly automated. More machines are used to perform the work of the factory, and each of these machines typically is becoming more complex.

The greatly increased complexity of automated and semi-automated factories provides many advantages. More highly automated factories are typically able to produce a higher volume and variety of products with better quality control. Thus, factories are expected to tend in the future toward higher levels of automation than currently exist.

One side effect of increasing complexity in the modern factory is the increasing difficulty of handling error conditions. The individual, highly complex machines used in many factories, such as fabrication and assembly facilities for integrated circuits, fail to a greater or lesser degree on a periodic basis. Many failures are not catastrophic in that the machine will continue to operate, although not within the desired parameters.

Products handled by out of tolerance machines may be rendered useless. Thus, the automated control systems for such machines generally contain a large number of sensors of the machine state. When some aspect of the machine goes out of tolerance, the control system can shut the machine down and raise an alarm for a human operator to intervene.

With very complex machinery, determining the cause of an error condition is not a trivial task. A given symptom may be caused by any of several independent failures, while a single failure can, depending on its precise nature, cause several different symptoms.

A human repair technician is required to fully check out a machine which has an error condition and make repairs as necessary. This can be an extremely time consuming process. Since so many process and machine variables interact in complex equipment, the repair technician is required to determine possible causes based on symptoms, determine proper operation of the appropriate parts of the machine in order to test his hypothesis, and effect repairs on malfunctioning items. As difficult as this task can be for even a highly trained technician operating on a single machine, the magnitude of the problem is compounded by the fact that dozens of different kinds of machines may be in operation on a single factory floor. Thus, a technician is required to be familiar with the operation and repair of many different machines.

The repair technician is faced with the further concern that some portion of the factory is shut down until repairs are complete. Since one of the characteristics of a highly automated factory is its high throughput of products, the down time required for repairs is especially problematical. This problem continues to worsen as factory machines continue to grow in number and complexity.

It would therefore be desirable to provide an automated diagnostic system which assists the repair technician with repairs of a machine in an error condition.

SUMMARY OF THE INVENTION

Therefore, according to the present invention, a diagnostics controller is attached to an automated or semi-automated factory machine. When a master controller indicates an error condition, a human operator is summoned, and the diagnostics controller is started. The diagnostics controller contains information regarding causes of error conditions in that machine, and, through a question and answer process, guides the repair technician to a determination of the cause of the error condition. In addition, the diagnostics controller makes use of the sensors normally available to the master controller during machine operation. This allows the diagnostics controller to automatically detect many important machine and process variables in order to assist with the diagnostic procedure.

The novel features which characterize the present invention are defined by the appended claims. The foregoing and other objects and advantages of the present invention will hereafter appear, and for purposes of illustration, but not of limitation, a preferred embodiment is shown in the accompanying drawings.

DESCRIPTION OF THE PREFERRED EMBODIMENT

An extremely large number of factory machines are amenable to the use of an automated diagnostics system such as will be described herein. For purposes of illustration, a diagnostic system will be described as implemented on a plasma etcher used in the production of integrated circuits. A typical plasma etcher to which this invention may be applied is the PAC 150 Plasma Etcher available from Texas Instruments.

Figure 1:
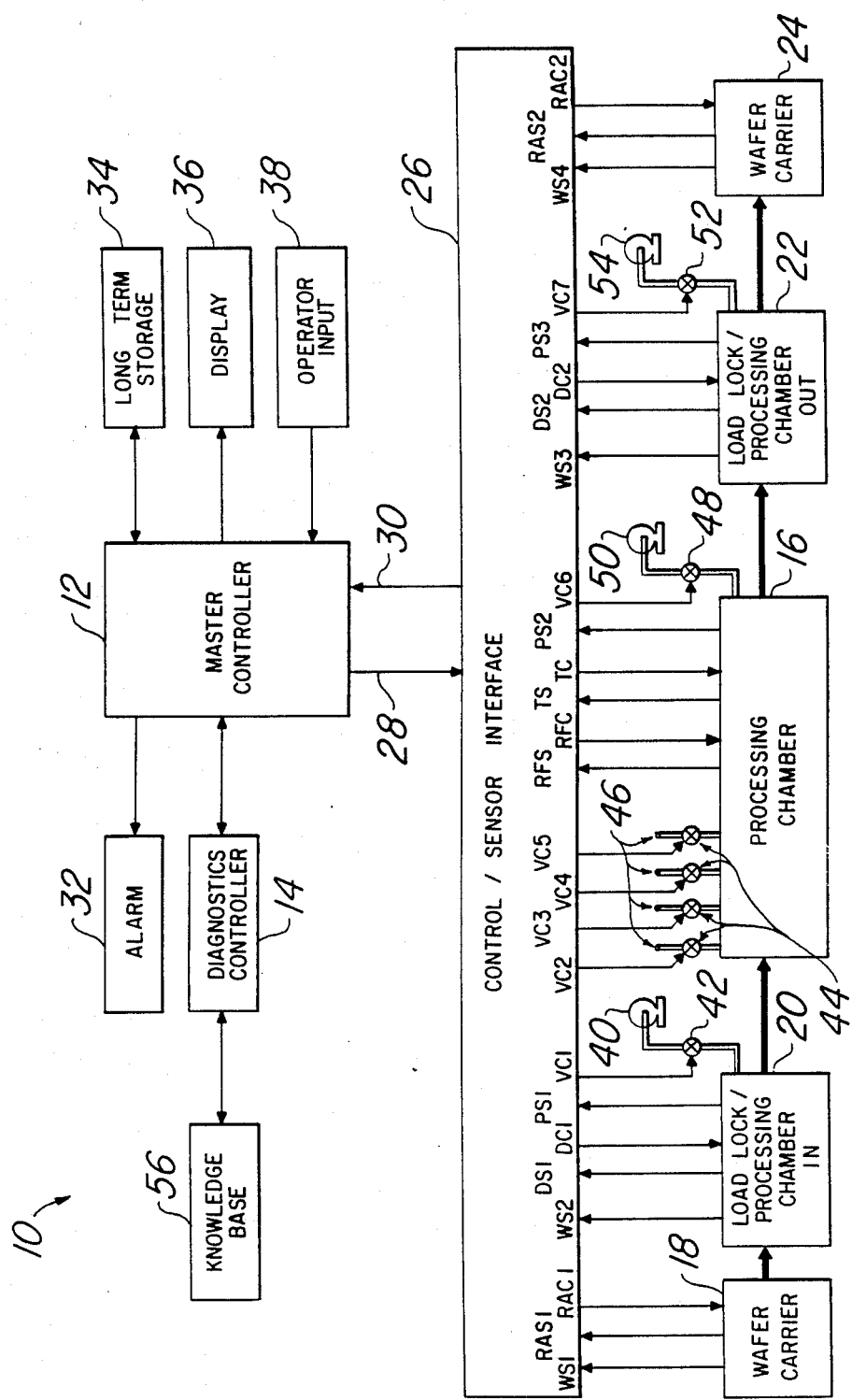
FIG. 1 is a functional block diagram of a plasma etcher having a master controller and diagnostics controller.

FIG. 1 shows a top level block diagram of a plasma etcher 10 having a master controller 12 for operations, and a diagnostics controller 14 to aid a repair technician in quickly locating and repairing an error condition. A central functional part of the plasma etcher 10 is the processing chamber 16. Semiconductor wafers (not shown) are placed in the processing chamber 16, the pressure in the chamber 16 is reduced, one or several of a number of process gases are introduced into the chamber 16, and radio frequency power is applied to the wafer.

The wafers introduced into the processing chamber are generally moved between machines in the factory in a wafer carrier. This carrier normally holds a number of wafers, typically twenty-five (25), by the edges so that they may be moved without damaging the wafers. The wafer carrier is loaded into the plasma etcher 10, and the wafers are processed one at a time.

The wafers are transferred from a wafer carrier 18 to a load lock/processing chamber in 20 one at a time. As each wafer is placed in the load lock chamber 20, a door (not shown) is closed and seals the interior of the chamber 20 from the atmosphere of the room. The load lock chamber 20 is evacuated, and the wafer transferred, internally to the etcher 10, to the processing chamber 16.

The load locks 20 and 22 can, depending on the particular etcher configuration, be used merely as air lock devices, or they can actually be used as additional processing chambers. For example, the incoming load lock 20 can be used to perform descum operations, and the outgoing load lock 22 can be used to perform microwave etching. As described in this embodiment, the load locks 20, 22 are used as simple air lock devices.

Not shown in FIG. 1 are the several gas lines normally connected to the load lock/processing chambers 20, 22. These are used to flood the load locks 20, 22 with nitrogen if the load locks 20, 22 are used only as load locks, and to supply various process gases if they are used for processing steps also. Control of these gas lines is similar to that described below in connection with the processing chamber 16, and is omitted from the present description for clarity in describing the present invention.

Once processing of the wafer is complete and the reaction gases are evacuated, the wafer is transferred to the load lock/processing chamber out 22, again internally to the etcher 10. The load lock door is opened, and the wafer transferred to a wafer carrier 24 which holds completed wafers. When either load lock chamber 20, 22 is open to the atmosphere, it is sealed from the processing chamber 16 by an airtight door.

The master controller 12 controls the operation of the plasma etcher 10 through a control/sensor interface 26. Communication with the control/sensor interface 26 is represented by a control line 28 and a sensor line 30. In actuality, the control/sensor interface 26 is a complex device, and may actually comprise several different modules. The master controller 12 is preferably a digital computer, which can read and set the values of selected memory locations and I/O ports.

The sensor portions of the interface 26 consist generally of A-D converters and registers for storing the current digital values of the sensors. The sensors used are those typically found in this type of machine, and are known in the art. Sensors such as temperature and pressure sensors generate analog voltages which are converted to digital values in the interface 26 and placed into registers. The master controller 12 then reads the values stored in the registers.

Sensing of certain mechanical conditions is done in a similar manner. Simple switch sensors indicate whether load lock doors are opened or closed, and the positions of robot arms used to transfer the wafers between the wafer carriers and the load lock chambers, while other sensors indicate whether a wafer is actually present in a particular chamber. The signals generated by such positions and status sensors are converted by the interface 26 into digital values representing their state and placed in registers to be read by the master controller 12.

By sampling the status of all sensors through the interface 26, the master controller 12 is aware of the current status of the etcher 10. During processing of a wafer, the master controller 12 expects to see certain values, in a certain temporal order, for the values supplied by the sensors. If something goes awry during processing, one or more of these values will change so as to be out of the tolerance regions expected by the master controller 12, indicating an error condition. The master controller 12 will then shut down operation of the etcher 10 and activate an alarm 32 for a human operator.

The master controller 12 also controls operation of the various steps of the process through the control/sensor interface 26. Values are placed into appropriate registers in the interface 26, and these values are converted, typically in D-A converters, to the signals necessary to actuate mechanical devices, which will perform such actions as operate robot arms and doors, open and close valves in gas lines, adjust the temperature in the processing chamber 16, and turn RF power to the processing chamber 16 on and off.

As described above, the master controller 12 is preferably a general purpose digital computer. In addition to the RAM, CPU, and so forth found in a typical digital computer, the master controller 12 utilizes a long term storage device 34, typically a disk drive, for storing control programs, process profiles for different processes, and results data showing actual operation of the system. The master controller 12 also drives a display 36 which is used by an operator, and accepts input from the operator through an input device 38. The input 38 and display 36 may be the same equipment to some extent, such as being combined into a touch-screen display. In addition, operator input by a keyboard is typical.

The control and sensor signals used in operation of the plasma etcher 10 will now be described in more detail. These signals do not represent all of those actually used in a plasma etcher, but are illustrative of the important ones. Different machines typically have different sets of sensors and controls.

The labeling scheme for the various signals shown in the control sensor interface 26 of FIG. 1 uses a consistent nomenclature. If the last letter of a signal name is "S", that signal represents a sensor signal. A "C" indicates a control signal. If similar control or sensor signals are used more than once, they are identified separately by a trailing digit. For the purposes of illustrating the present invention, the number and nature of the control and sensor signals from FIG. 1 is simplified from those found in a natural system.

The wafer carrier 18 has a sensor signal, WS1, which senses the presence of a wafer in the carrier 18. Secondary signals (not shown) are used to indicate the locations of the wafers for wafer carriers handling more than one wafer at a time. A robot arm (not shown) is used to select a wafer from the wafer carrier 18 and transport it into the load lock chamber 20 and is controlled by robot arm control signal RAC1, while the current position and status of the robot arm is transmitted to the interface 26 as signal RAS1.

Sensor signals which indicate the presence and position of wafers throughout the system are designated by the signals WS2, WS3, and WS4, used to sense the wafer in the load lock chamber in 20, load lock chamber out 22, and wafer carrier 24, respectively. In typical plasma etchers, several wafers will be moving through the etcher at the same time. Thus, after a wafer moves from the load/lock chamber in 20 to the processing chamber 16, another can be moved from the wafer carrier 18 to the chamber 20. The signals WS2, and WS3 convey less information than WS1 and WS4, in that they indicate only the presence or absence of a single wafer.

The load lock chamber in 20 consists of a chamber which can be sealed from room atmosphere and evacuated by a vacuum pump 40. Opening and closing of the door to the room is controlled by signal DC1, and door position is indicated by the signal DS1. This is usually implemented in actuality by 2 different sensors which indicate the door fully open and fully closed positions. Similar signals DS2 and DC2 are used to control and sense the position of the door of the load lock chamber out 22.

Gas pressure within the load lock chamber in 20 is indicated by the signal PS1. The valve control signal VC1 is used to open and close a valve 42 to the vacuum pump 40 in order to pump down the pressure in the load lock chamber 20 as desired.

Within the processing chamber 16, various process gases are introduced in order to perform the plasma etch. In addition, it is common to have a nitrogen purge line which can clear all reactive gases out of the chamber prior to removing a wafer to the load lock chamber out. Valves 44 in the gas lines 46 are used to control rate of input of such gases into the chamber 16, and are controlled by valve control signals VC2, VC3, VC4 and VC5. Gas pressure within the processing chamber 16 is indicated by signal PS2. Evacuation of the processing chamber 16 is controlled by a valve 48 in a line to a vacuum pump 50, with the valve 48 being controlled by signal VC6.

Temperature within the processing chamber 16 is controlled by signal TC, and sensed by TS. The application of RF power is controlled by the signal RFC, and sensing of RF conditions within the chamber is done by the signal RFS. As shown in FIG. 1, the RF source and its control are located in the processing chamber 16 itself.

Within the load lock chamber out 22, the signals WS4, DS2, and DC2 have already been described. PS3 is a sensor signal of the pressure within the load lock chamber out 22, and VC7 is used to control a valve 52 in a line coupled to a vacuum pump 54 to control pumpdown of the chamber 22.

The signals WS5, RAS2 and RAC2 connected to the wafer carrier 24 act in an analogous manner to those associated with the other wafer carrier 18.

As described above, the master controller 12 sets and reads digital values in registers within the control/sensor interface. Control values are translated by D-A converters within the interface into appropriate control signals, and applied to the appropriate parts of the etcher 10 as described above. Conversion of these values to control signals appropriate to control the various types of devices is known in the art.

The various sensor signals are typically analog values, having a range which varies depending on the type of sensor involved. These analog values are converted to digital values and stored in registers where they can be read by the master controller 12. Use of these various sensors, and their translation into digital values to be read by the master controller 12, are consistent with current practice and known in the art.

The master controller 12 monitors operation of the etcher 10 by sampling the various sensor values on a periodic basis. Occasionally, if a measured value departs slightly from the expected value, the master controller 12 can compensate by adjusting an appropriate control signal. For example, if gas pressure is slightly high within a chamber, it can be reduced by controlling the appropriate valve connected to a vacuum pump, or to a gas line.

When an error condition occurs during operation of any portion of the etcher 10, one or more of the sensor signals will eventually depart from the expected value by more than a maximum allowable tolerance. When this happens, the master controller 12 signals an alarm to attract a human operator, and shuts down operation of the etcher 10.

When the human operator arrives, the diagnostics controller 14 is invoked in order to assist in the repair of the machine. This diagnostics controller 14 is connected to the master controller 12, and additionally contains a knowledge base 56 of data concerning possible errors within the machine, their causes, and methods of repair.

The diagnostics controller 14 appears to an operator attempting to repair the machine very much as a typical expert system. A series of questions are presented to the operator, and decisions made as to possible causes of the error based on the responses of the operator. In addition to querying the operator, the diagnostics controller 14 can determine the state of the sensors available in the interface 26 in order to make measurements which would be difficult or impossible for the operator. This is done by requesting a value from the master controller 12, which reads the appropriate sensor value from the interface 26 and returns it to the diagnostics controller 14. For example, the diagnostics controller 14 can quite easily determine pressures and temperatures within the various chambers, and display them to the operator. The values sensed through the interface 26 can be used by the diagnostics controller 14 in the same manner as if these values had been entered by the operator after manual measurement.

The diagnostics controller 14 can be attached to a machine as a completely independent system. Preferably, however, it is a software program, or series of programs, which run on the general purpose computer of the master controller 12. In this manner, by loading additional software into the master controller system, including device drivers which can sample the values available at the interface 26 and make them available to the expert system program of the diagnostics controller 14, new machines can be retrofit with a diagnostics controller 14 with little or no change to their hardware.

Any of several different types of expert system can be used for the diagnostics controller 14. In many instances of error diagnosis and repair, the necessary knowledge can be represented as a simple decision tree, which may be preferable to more complex rule based systems. A small portion of a decision tree incorporating knowledge and procedures about repair of a plasma etcher 10 is shown in FIG. 2.

Presentation of an entire decision tree for a given plasma etcher requires a tremendous amount of detail not necessary to an explanation of the present invention. In addition, every different machine will have a different set of decisions and rules necessary for its diagnosis and repair. These are assembled by experts familiar with any particular machine, and used to create the decision tree, or other rule based system, for a particular machine in a manner well known in the expert system art.

Figure 2:
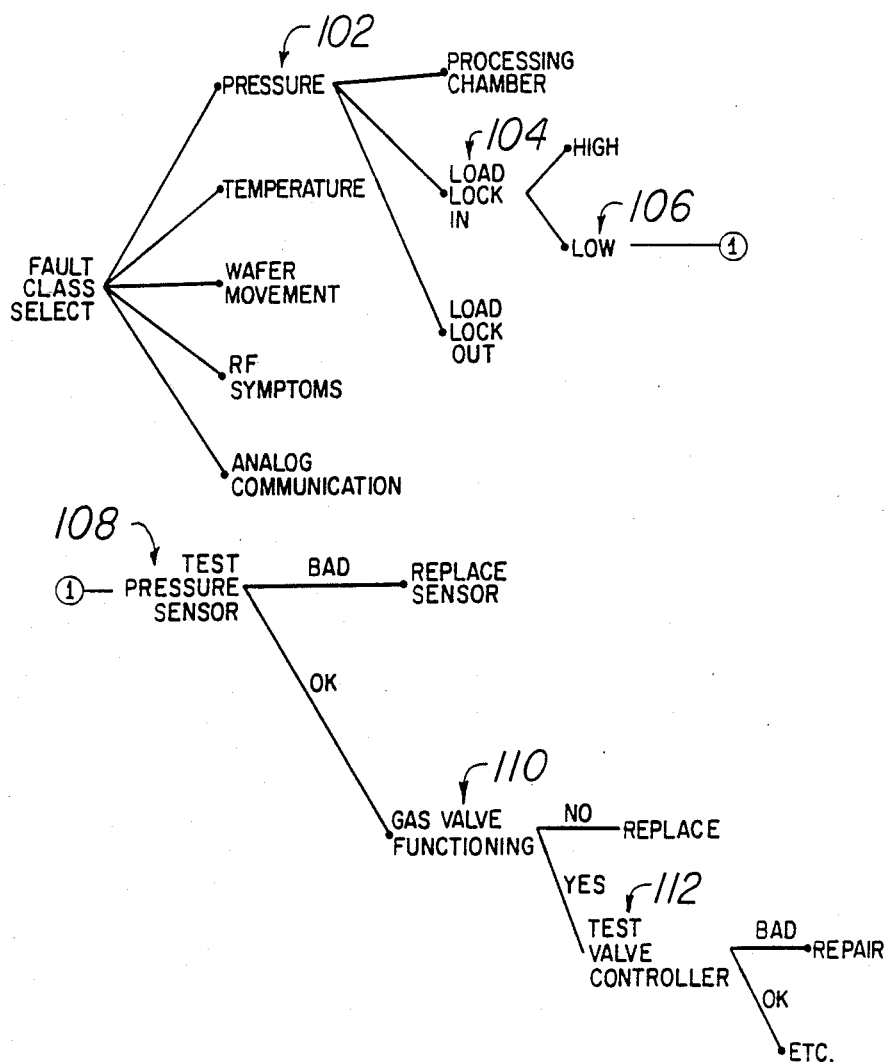
FIG. 2 is a portion of a tree data structure usable by a diagnostics controller according to the present invention.

In the decision tree of FIG. 2, the first step once an operator has been called is to determine what general type of error is present 100. This information is available within the master controller 12, which raises the error and indicates which type of error it raised. Typical problems within a plasma etcher 10 relate to pressure, temperature, wafer movement, RF symptoms, and analog communication. Analog communication generally relates to the signals moving between the control/sensor interface 26 and the various chambers 16, 20, 22 and other parts of the system.

Referring to FIG. 2, an example is shown which relates to an error condition detected by the master controller 12 caused by low gas pressure in the load lock chamber in 20. Once the pressure fault class has been selected (Step 102), decision tree branches related to load lock in 104 and low pressure 106 are taken. These may be done automatically by the diagnostics controller 14 based upon the error condition raised by the master controller 12, or they may be done manually by an operator keying in information at a keyboard or touch screen 38 based upon an independent readout of the error condition indicated by the master controller 12. Automation of this task depends on the degree of coupling between the diagnostics controller 14 and the master controller 12. A tight coupling allows the diagnostics controller 14 to perform more steps based upon the state of the master controller 12, while a looser coupling requires some information to be transferred between the controllers 12, 14 based upon keyboard inputs and response to prompts generated by the diagnostics controller 12. A looser coupling will, in general, be easier to implement, while a tighter coupling will require less manual data entry by the repair technician.

Once the diagnostics controller 14 has determined that the actual problem is a low pressure within the load lock in module (Step 106), a list of possible causes needs to be checked. For example, the pressure sensor could actually be malfunctioning, or gases might not be properly feeding into the chamber 20. Since many of the possible causes of the error condition are within the control circuitry of the machine, as opposed to an actual fault within the chamber itself, a large number of possible avenues must be checked. One sample series of some of these checks are shown in FIG. 2. A first test could be to test the pressure sensor itself (Step 108). This would typically be done by having the repair technician check a sensor manually, with a voltmeter or other test equipment. The diagnostics controller 14 would write onto the display 36 a description of the test that should be made, and the expected results if the sensor is functioning properly. For example, a description could tell the repair technician to connect a voltmeter between leads 3 and 17, and read the DC voltage across them. If the voltage is 5, the sensor is good, otherwise it may be bad and further checks should be made to the sensor or the sensor replaced.

In the sample decision tree, if the sensor itself checks OK, functioning of a gas valve into the chamber can be tested 110, as well as the controller for the valve 112 if the valve itself is functional. Testing of various system conditions may be made automatically at some steps, and manually at others.

This type of branching based on various states of the machine continues until a cause for the error is identified, or it is determined that the knowledge base 56 does not have the capability of solving the problem. In many instances, there will be more than one cause for an error, such as a faulty power supply destroying a sensor and controller. Thus, it may take several passes through the knowledge base 56 to isolate all the possible faults.

When the diagnostics controller 14 tracks through the knowledge base 56 as described above, it is preferable for a record of the process to be stored on the long term storage device 34. This is useful both for profiling the history of the etcher, and for identifying problems which are not covered by the knowledge base 56 and which must be addressed by an expert to be added to the knowledge base 56.

Figure 3:
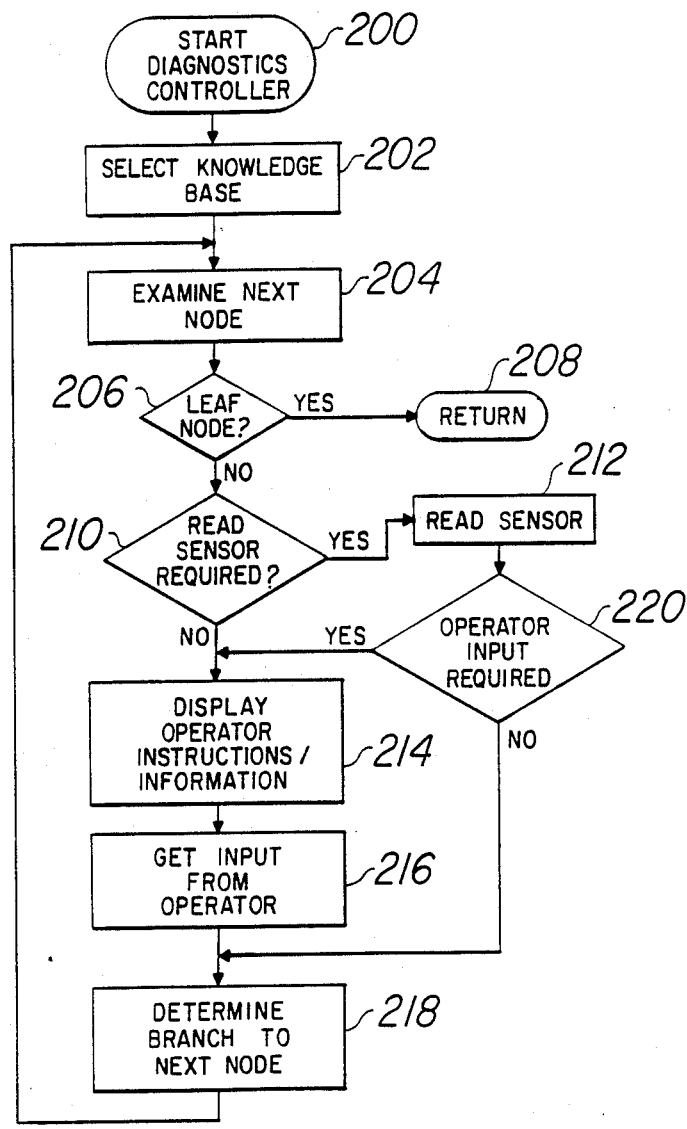
FIG. 3 is a flow chart of the operation of a diagnostics controller.

FIG. 3 is a simplified flow chart illustrating the procedure by which the diagnostics controller 14 travels through the decision tree stored in the knowledge base 56. The diagnostics controller 14 is started 200 by the operator after an alarm is signaled, and the appropriate portion of the knowledge base 56, depending on the type of fault encountered, is selected 202.

Next, one node of the decision tree is examined 204. The node type is tested 206, and if the node is a leaf node, that is, there are no more paths to be taken from this point, the diagnostics controller 14 indicates its analysis, or failure to determine the cause of the error, and returns 208. If this is not a final node, the diagnostics controller 14 determines whether reading of one or more sensors is required at this time 210. If not, instructions are displayed to the operator 214, and the diagnostics controller 14 awaits operator input. Sometimes a single operator input is required, such as "is switch X on or off?", whereas other situations require a more complex interaction as known in the art. Once all the input has been received 216, it is used to determine which node to branch to next 218. At this time, the same procedure (Steps 204 through 218) is repeated on such next node.

If a sensor read was required in step 210, the sensor value is read by querying the master controller 12. (step 212) In step 220, if further operator input is required at this node, the program flow returns to step 214. In many instances, no further operator input is required for this node, and control flows to step 218 to determine the next node based on the results of the sensor reading. The primary work done by the diagnostics routine is the same whether input is required from the operator or the sensor interface 26.

A diagnostics controller 14 according to the present invention therefore has the capability of automatically sensing selected states within the machine, and making queries and decisions based on such sensors' input and on input from a human repair technician.

TECHNICAL ADVANTAGES

When a diagnostics system as described above is used in connection with factory machinery, a number of important advantages are obtained. A repair technician need not be an expert on repair of any particular machine; the necessary expertise relating to that particular machine is embodied in the knowledge base of the diagnostics system. Repairs can be effectuated with significant time savings because the system automatically directs the technician through an efficient course of testing to determine the cause of the problem. Once the problem has been determined, the system can display instructions for the most efficient method of repair of the problem. Thus, it is not necessary for the technician to peruse the hefty tomes typically necessary for troubleshooting a machine in an error condition. The diagnostics system is able to assist the repair technician in his task by making measurements of internal conditions which may be difficult or impossible for the technician to make directly.

Thus, a diagnostics system which can be easily added to nearly any current automated or semi-automated factory machine has been described. It may be designed directly into the system with hardware assist, or added retroactively as software in many instances. The expertise of one or more very knowledgeable persons are embodied in the knowledge base so that a repair technician need not be an expert for every different machine on the factory floor. Thus, repairs can be effectuated more accurately and faster by a typical skilled technician, with potentially large savings in time and money for factory operation and improved product quality control.

Although the preferred embodiment was described as relates to a plasma etcher for a semiconductor front end, those skilled on the art will see that the same principles can be applied to many types of machines. Highly automated factory machines are especially adaptable, inasmuch as they already have automatic sensors and controllers, and it is only necessary to add a diagnostics controller 14 and knowledge base 36. In some cases, the diagnostics controller 14 and knowledge base 36 can be implemented entirely in software, to be executed on a digital computer already in place on the machine.

The knowledge base 36 was described as a decision tree, but other representations appropriate for expert systems may be used. For example, as the knowledge base 36 can contain a set of rules and a set of known facts to be used with a rule based expert system. Some of the facts for such a system would be represented by the instantaneous values of the sensors as found in the control/sensor interface 26. Simpler systems could actually hard-core the knowledge into the software of the diagnostics controller 14.

The present invention has been illustrated by the system described above, and it will become apparent to those skilled in the art that various modifications and alterations may be made thereto. Such variations fall within the spirit of the present invention, the scope of which is defined by the appended claims.

What is claimed is:

1. An automated diagnostic system, comprising:
   a machine for performing process steps on a workpiece, wherein a plurality of process variables assume different states;
   an interface coupled to said machine for sensing the state of said plurality of process variables, and for controlling said plurality of process variables;
   a master controller coupled to said interface for setting values for the plurality of process variables to be controlled, and for reading the state of the plurality of process variables to be sensed, wherein said master controller generates an error signal and suspends operation of said machine when a sensed process variable moves out of a preselected range; and
   a diagnostics controller coupled to said master controller for, when operation of said machine has been suspended by said master controller, sensing the state of process variables to be sensed, for querying an operator regarding other states of said machine, and for applying the sensed states and results of operator inquiries to an expert system having a set of rules and a set of facts capable of identifying possible causes for the error signal, to determine the cause of the error.

2. The automated diagnostic system of claim 1, wherein the expert system utilized by said diagnostics controller performs a search of a decision tree.

3. A method for diagnosing the cause of an error condition in a machine, responsive to an error signal generated by means including a sensor for detecting the status of a process variable, comprising the steps of:
   (a) halting operation of the machine;
   (b) querying an operator to determine a current status for said process variable;
   (c) sensing states of process variables within the machine without operator intervention;
   (d) applying the results of steps (b) and (c) to an expert system having a set of rules and a set of facts capable of identifying possible causes for the error signal, to determine the cause of the error; and
   (e) repeating steps (b), (c), and (d) until the cause of the error is diagnosed.

4. The method of claim 3, wherein the expert system utilized in step (d) performs a search of a decision tree.

5. A system for diagnosing an error condition in a machine, responsive to an error signal generated by means including a sensor for detecting the state of a process variable, comprising:
   a diagnostics controller coupled to the machine, wherein said diagnostics controller can determine the state of said process variable within the machine;
   an interactive input/output device, coupled to said diagnostics controller, for communication with an operator, wherein enquiries are displayed to the operator and answers are received from the operator; and
   a knowledge base coupled to said diagnostics controller, said knowledge base containing information regarding the cause and effect of said error condition within the machine;
   wherein said diagnostics controller, when said error condition occurs within the machine, queries the operator through the input/output device, senses the state of said process variable within the machine independently of the operator, and applies the information so received and sensed to the knowledge base to determine the probable cause of said error condition.

6. The system of claim 5, wherein said knowledge base comprises a set of rules and facts.

7. The system of claim 5, wherein said knowledge base comprises a decision tree of error condition causes and effects.

8. The system of claim 5, wherein said diagnostics controller comprises an expert software system operating on a general purpose computer.

9. The system of claim 8, wherein said expert software system operates on a general purpose computer also used to control operation of the machine during normal operation.

10. The system of claim 5, further comprising a long term storage device coupled to said diagnostics controller for storing sequences of steps taken by said diagnostics controller during diagnosis of an error condition.

* * * * *